United States Patent [19]

Argillier et al.

[11] Patent Number: 5,637,556
[45] Date of Patent: Jun. 10, 1997

[54] PROCESS AND WATER-BASE FLUID FOR CONTROLLING THE DISPERSION OF SOLIDS APPLICATION TO DRILLING

[75] Inventors: Jean-François Argillier, Suresnes; Annie Audibert, Le Vesinet, both of France; Louise Bailey, Comberton; Paul I. Reid, Cambridgeshire, both of Great Britain

[73] Assignees: Institut Francais du Petrole, Rueil-Malmaison, France; Dowell Schlumberger, Inc., Sugerland, Tex.

[21] Appl. No.: 433,959

[22] Filed: May 4, 1995

[30] Foreign Application Priority Data

May 4, 1994 [FR] France .................. 94 05489

[51] Int. Cl.$^6$ .............................. E21B 43/22; C09K 7/02
[52] U.S. Cl. .................. 507/120; 507/119; 507/121; 507/227; 507/112
[58] Field of Search ............... 507/119, 120, 507/121, 227

[56] References Cited

U.S. PATENT DOCUMENTS

| | | | |
|---|---|---|---|
| 3,434,970 | 3/1969 | Siegele et al. .................. | 507/120 |
| 4,529,523 | 7/1985 | Landoll .......................... | 252/8.55 D |
| 4,670,501 | 6/1987 | Dumond et al. ............... | 507/120 |
| 4,694,046 | 9/1987 | Bock et al. ..................... | 525/329.4 |
| 5,208,216 | 5/1993 | Williamson et al. ........... | 507/120 |

FOREIGN PATENT DOCUMENTS

| | | |
|---|---|---|
| 0 115 703 | 8/1984 | European Pat. Off. . |
| 2 213 850 | 8/1989 | United Kingdom . |

OTHER PUBLICATIONS

Database WPI, Derwent Publications Ltd., London, GB, AN 83-787503 [41], 7 Dec. 1982.

*Primary Examiner*—David B. Springer
*Attorney, Agent, or Firm*—Millen, White, Zelano & Branigan, P.C.

[57] ABSTRACT

For controlling the dispersion of solids, e.g., cuttings, in water-based fluid used during operations such as drilling, completion or workover operations in a well crossing at least one permeable geologic formation, there is added to the fluid an optimized amount of a water soluble polymer HM PAM based on acrylamide and hydrophobic units. In a variant, a useful amount of hydrophobically modified cellulose derivative, e.g., modified hydroxyethylcellulose, HMHEC, is also added, thus forming a fluid containing HM PAM and HM HEC. The process has particular application to slimhole and/or strongly deviated drilling.

30 Claims, No Drawings

PROCESS AND WATER-BASE FLUID FOR CONTROLLING THE DISPERSION OF SOLIDS APPLICATION TO DRILLING

FIELD OF THE INVENTION

The present invention relates to a process for controlling the dispersion of cuttings in a water-base fluid used in a well for drilling, completion or workover operations in said well. More generally, the process is suited for controlling the dispersion or the break up of solids contained in the fluid.

BACKGROUND OF THE INVENTION

What is referred to as completion relates to operations of preparation or outfitting necessary for bringing a geologic formation into production from the wellbore. These completion operations utilize particular fluids called completion fluids.

What is referred to as a workover operation relates to an operation performed in a producing or a potentially producing well. Workover fluids can be used in the producing well in circulation in a comparable way to drilling fluids or in the form of a spacer fluid.

During a well drilling operation, be it an oil well or not, a fluid is injected down to the drill bit through the drill pipes, the fluid flowing up to the surface in an ascending flow in the annular space defined by the hole drilled and the outside of the drill pipes. In order to perform rock drilling under good conditions, the fluid is determined in order to have particular properties.

Generally, the fluid must notably be capable of keeping the cuttings in suspension during periods of stopped circulation, of carrying along and driving effectively the cuttings towards the surface, of having a low filtration rate through the permeable hole walls, be sufficiently weighted to control the pressures, and less capable of cleaning the bit and the bit-gage surface.

Many additives for water-base fluids allowing the properties required for a good drilling fluid to be obtained are known.

In order to control the capacity of a fluid to prevent cuttings dispersion, a test referred to as a hot rolling cuttings test, which is for example described in document U.S. Pat. No. 4,664,818 or in document U.S. Pat. No. 5,260,269, is carried out.

SUMMARY

The present invention thus relates to a process for controlling the dispersion to and/or the break up of solids suspended in a water-base fluid. The process comprises the stage of addition to said fluid of a useful amount of a polymer called HM PAM and resulting from the polymerization of hydrophilic units with a hydrophobic unit. The hydrophilic unit includes:

acrylamide according to the following formula:

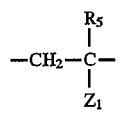

where $R_5$ is H or $CH_3$, and $Z_1$ is $CONH_2$, and possibly acrylic acid, acrylate or sulfonate comonomers according to the following formula:

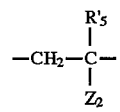

where $R'_5$ is H or $CH_3$, and $Z_2$ is COOH or $COO^-,M^+$ or $CONHR_1SO_3-$, $M^+$; $R_1$ is H or a $C_1-C_{30}$ alkyl, aryl or alkyl-aryl radical, the hydrophobic unit of the polymer HM PAM has at least one of the following forms: N-alkylacrylamide, alkylacrylate, N-substituted acrylamide or a substituted acrylate, the substituted part being a nonionic surfactant, said hydrophobic unit having the general formula as follows:

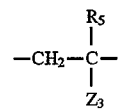

where $R_5$ is H or $CH_3$, and $Z_3$ is $COOR_7$, $COOR_2$, $CONR_1R_2$, or $CONR_1R_7$, $R_7$ being a nonionic surfactant and $R_2$ a $C_1-C_{30}$ alkyl, aryl or alkyl-aryl radical; $R_1$ is H or a $C_1-C_{30}$ alkyl, aryl or alkyl-aryl radical.

The watersoluble polymers HM PAM are obtained by copolymerization of watersoluble monomers with a hydrophobic monomer in a hydrophilic/hydrophobic molar ratio of 90/10 to about 99.995/0.005, preferably 95/5 to about 99.9/0.1. Their molecular mass is greater than $10^6$ daltons.

The polymer HM PAM is referred to as H1PAM when it can be an acrylamide and nonyl methacrylate copolymer (i.e. $R_5$ is $CH_3$; $Z_3$ is $COOR_2$ with $R_2=C_9H_{19}$), when it can have a molecular mass of about $8 \cdot 10^6$ daltons and a concentration of hydrophobic units ranging between 0.5 and 1.5%.

A useful amount of a hydrophobically modified cellulose derivative can be added.

Said cellulose derivative can be hydrophobically modified hydroxyethylcellulose (HM HEC).

The modified hydroxyethylcellulose can contain a hydrophobic alkyl radical including between 4 and 25 carbon atoms, preferably between 8 and 18.

The molecular mass of the modified hydroxyethylcellulose can be less than 2,000,000 daltons and preferably ranges between 20,000 and 500,000 daltons.

Hydrophobically modified cellulose derivatives mainly derive from cellulose derivatives which are conventionally used, such as carboxymethylcellulose (CMC), hydroxyethylcellulose (HEC) or hydroxypropylcellulose (HPC). These derivatives can be chemically modified through the incorporation of alkyl groups by a chemical reaction affecting certain cellulose units. These hydrophobically modified cellulose derivatives, notably HM HEC, HM CMC, HM HPC, are described in document EP-A1-465,992.

The polymer HM HEC or hydrophobically modified hydroxyethylcellulose has been described in document U.S. Pat. No. 4,228,277 and in the publication "Synthesis and solution properties of hydrophobically modified hydroxyethylcellulose" by A. C. SAU and L. M. LANDOLL, in "Polymers in aqueous media: performance through association", J. E. Glass (Ed), Adv. Chem. Ser. 213, ACS Wash. 1989.

The HM HEC, nonionic and watersoluble, can be prepared from HEC or hydroxyethylcellulose, by chemical incorporation of a long alkyl chain between $C_4$ and $C_{25}$, preferably between 8 and 18 carbon atoms for the hydrophobic unit.

The hydrophobic unit, is bound to the cellulose through an ether or an ester bond, preferably an ether bond because this type of bond is more stable when the polymer is in aqueous solution.

The rate of hydrophobic units can range from 0.2 to about 5%, preferably between 0.2 and 1.5% and more specifically between 0.2 and 1%.

The polymer HM HEC can have a hydroxyethyl unit molar substitution rate of at least 1.5, preferably between 1.5 and 4, i.e. from 1.5 to 4 moles of hydroxyethyl substituents per anhydroglucose unit, and a relatively low molecular mass, i.e. less than 2,000,000 daltons and preferably between 20,000 and 500,000 (i.e. a degree of polymerization between 75 and 1800).

In the process, it is possible to add between 1 and 30 g/l of HM PAM and between 1 and 30 g/l of HM HEC, and preferably between 1 and 6 g/l of HM PAM and between 1 and 5 g/l of HM HEC.

The invention also relates to a water-base fluid intended for well drilling or completion or for workover operations in a well. The fluid includes in useful amount of at least:
one polymer, called HM PAM, resulting from the polymerization of hydrophilic units with a hydrophobic unit. The hydrophilic unit includes:
acrylamide according to the following formula:

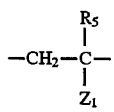

where $R_5$ is H or $CH_3$, and $Z_1$ is $CONH_2$,
and possibly acrylic acid, acrylate or sulfonate comonomers according to the following formula:

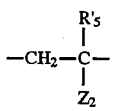

where $R'_5$ is H or $CH_3$, and $Z_2$ is COOH or $COO^-$, $M^+$ or $CONHR_1SO_3^-$, $M^+$; $R_1$ is H or a $C_1$–$C_{30}$ alkyl, aryl or alkyl-aryl radical,
the hydrophobic unit of the polymer HM PAM has at least one of following forms: N-alkylacrylamide, alkylacrylate, N-substituted acrylamide or a substituted acrylate, the substituted part being a nonionic surfactant, said hydrophobic part having the general formula as follows:

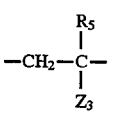

where $R_5$ is H or $CH_3$, and $Z_3$ is $COOR_7$, $COOR_2$, $CONR_1R_2$, or $CONR_1R_7$, $R_7$ being a nonionic surfactant and $R_2$ a $C_1$–$C_{30}$ alkyl, aryl or alkyl-aryl radical; $R_1$ is H or a $C_1$–$C_{30}$ alkyl, aryl or alkyl-aryl radical
and a hydrophobically modified cellulose derivative.

The polymer HM PAM can have a molecular mass ranging between $10^6$ and $10^7$ daltons and a concentration of hydrophobic units ranging between 0.5 and 4%.

The polymer HM PAM, then called H1PAM, can be an acrylamide and nonyl methacrylate copolymer (i.e. $R_5$ is $CH_3$; $Z_3$ is $COOR_2$ with $R_2=C_9H_{19}$), it can have a molecular mass of about $8 \cdot 10^6$ daltons and a concentration of hydrophobic units ranging between 0.5 and 1.5%.

Said cellulose derivative can be hydrophobically modified hydroxyethylcellulose (HM HEC).

The viscosity of the fluid can be mainly controlled by adding at least one polymer selected from the group made up of xanthan, scleroglucan, wellan, hydroxyethylcellulose (HEC), CMC, guar gum and the polyacrylamides.

The fluid can include at least one electrolyte at concentrations which can reach saturation.

Said electrolyte can be selected from the group made up of sodium, potassium, calcium, magnesium or zinc chloride, bromide, carbonate, acetate, formate, sulphate, silicate, phosphate.

The fluid can include between 0.5 and 30 g/l of HM HEC and of HM PAM, and between 0.5 and 20 g/l of viscosifying polymer.

The fluid can contain between 0.5 and 10 g/l of HM HEC and of HM PAM, between 1 and 5 g/l of viscosifying polymer, preferably xanthan, between 5 and 100 g/l of KCl or NaCl and between 0 and 30 g/l of reactive clay.

The invention can apply to a drilling fluid.

The drilling operation can be advantageously slim-hole drilling and/or strongly deviated drilling with respect to the vertical.

The invention further relates to an additive for controlling the dispersion and/or the break up of solids suspended in a water-base fluid. The additive includes HM PAM and a hydrophobically modified cellulose derivative.

The advantages and features of the present invention will be clear from reading the description of the tests hereafter.

TEST No.1: CUTTINGS RESISTANCE

This test allows to measure the capacity of a drilling, a completion or a workover fluid not to destroy the cohesion of a solid suspended in the fluid, especially a geologic formation debris known as cuttings, and particularly shale or clay cuttings.

DESCRIPTION OF THE TEST PROCEDURE

Most of the tests have been carried out on cuttings or pieces of clay referred to as London Clay, whose size ranges between 1 mm and 2.8 mm, kept in a desiccator so that their water activity is about 0.9. The London Clay contains about 23% of smectite, 29% of illite and 11% of kaolinite.

Three grams of clay are introduced into a 300-$cm^3$ cell containing 100 $cm^3$ of the fluid to be tested. Four 16-mm diameter steel balls are then introduced into the cell. This cell is placed on a rotating system for an hour at a temperature of 30° C.

The fluid is thereafter screened through two sieves in series whose respective mesh size is 1 mm and 0.25 mm. The clay is recovered oil each sieve. After drying, the clay recovered is weighed.

The results are expressed in percentage by weight of clay recovered on each sieve with respect to the initial weight of clay suspended.

The different components of the fluids tested are:
xanthan, CMC LV which is a product manufactured by the AQUALON company, HM HEC as defined above and a polymer H3 defined hereafter:

A hydrophilic/hydrophobic polymer called Hb1 is described in document FR-2,686,892 related to document PCT/FR93/00,090 published under No. WO 93/15,164. The polymer Hb1 is defined in these documents as having a —(Hb)-(Hy)— type structure with a statistical distribution, said structure resulting from the radical polymerization of ethylene monomers containing carboxylic functions, notably an $C_1$–$C_{30}$ acrylate/alkyl acrylate copolymer corresponding to the following formula:

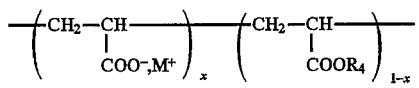

where x ranges between 0.4 and 0.8, M is H or Na or K or any other monovalent ion, R4 is $C_1$–$C_{30}$ alky, aryl or alkyl-aryl radical and the length of the hydrophobic units $R_4$ is selected as a function of the molecular mass of said polymer according to the following rules:

for a polymer having a molecular mass less than about $10^5$ daltons, $R_4$ contains at least two carbon atoms, for a polymer having a molecular mass ranging between about $10^5$ and $2.5\ 10^6$ daltons, $R_4$ contains at least four carbon atoms.

In a variant, the polymer Hb1 takes the name of H3 when the value of x is 0.8, when $R_4$ contains four carbon atoms and when the molecular mass of the polymer ranges between $10^4$ and $5\ 10^4$ daltons, and is preferably close to $1.7\ 10^4$ daltons.

TEST No.1: COMPARISON OF DIFFERENT FORMULATIONS

Formulations:

F0: xanthan (4 g/l), KCl (50 g/l)

F1: xanthan (4 g/l), CMC LV (10 g/l), KCl (50 g/l)

F2: xanthan (4 g/l), CMC LV (10 g/l), H3 (4 g/l), KCl (50 g/l)

F3: xanthan (4 g/l), HM HEC (4 g/l), KCl (50 g/l)

F4: xanthan (4 g/l), H1PAM (3 g/l), KCl (50 g/l)

F5: xanthan (4 g/l), HM HEC (4 g/l), H1PAM (3 g/l), KCl (50 g/l)

F6: xanthan (4 g/l), H3 (4 g/l), CMC LV (10 g/l), H1PAM (2 g/l), KCl (50 g/l).

| Formulations | F0 | F1 | F2 | F3 |
|---|---|---|---|---|
| % of cuttings recovered of size d > 1 mm | 0 | 16 | 16 | 0 |
| % of cuttings recovered of size d (1 mm > d > 0.25 mm) | 5 | 80 | 80 | 5 |

The first four tests show that, under the same salinity conditions:

xanthan alone break up and disperses the clayey cuttings, the CMC LV reduces the dispersion, in the presence or absence of polymer H3. Polymer H3 thus has no notable influence on the capacity not to disperse the clay, the polymer HM HEC also has no notable influence on the capacity of the formulation not to disperse the clay.

| Formulations | F4 | F5 | F6 |
|---|---|---|---|
| % of cuttings recovered of size d > 1 mm | 80 | 95 | 42 |
| % of cuttings recovered of size d (1 mm > d > 0.25 mm) | 6 | 2 | 50 |

This series of tests shows that:

the polymer H1PAM highly decreases the break up and the dispersion of the cuttings, the combination of H1PAM and HM HEC improves the capacity of formulation F5 to reduce the break up and the dispersion of the cuttings, the test carried out with formulation F6, including H3 and a filtrate reducer (CMC LV) and a H1PAM concentration of 2 g/l, shows in comparison to formulation F2 that the dispersion or the break up is decreased by the presence of H1PAM.

H1PAM can thus be used alone for controlling the capacity of a formulation to decrease the break up and the dispersion of the cuttings. However, a formulation combining H1PAM and HM HEC is even more efficient for controlling said property.

Test No.2: Influence of the hydrophobically modified polyacrylamide (H1PAM) concentration The influence of the H1PAM concentration is studied in this series of tests.

Base formulation: H3 (4 g/l), xanthan (2 g/l), HM HEC (4 g/l), KCl (50 g/l).

Different H1PAM concentrations are added to this base formulation.

| H1PAM concentration (g/l) | 0 | 0.5 | 1 | 2 | 3 |
|---|---|---|---|---|---|
| % of cuttings recovered of size d > 1 mm | 2 | 45 | 55 | 71 | 84 |
| % of cuttings recovered of size d (1 mm > d > 0.25 mm) | 97 | 50 | 39 | 18 | 10 |

It is clear that the influence of H1PAM is strong on the good results obtained with this type of test.

Test No.3: Cuttings dispersion test carried out on recompacted bentonite pellets (100% of Wyoming montmorillonite): a very reactive model shale Cuttings consisting of recompacted bentonite pellets have been used in this series of tests. The cell containing the clay+formulation suspension is kept rotating for 16 hours. No ball is introduced in the cell. The clay used is a Wyoming montmorillonite containing exchangeable cations of 70% Na, 30% Ca composition. The original pellets have a cylindrical shape (height=5 mm, diameter=5 mm) and they are prepared by compaction of the clay in a press at 4 to 5 t/cm². Their water activity is then about 0.5. The results are expressed in percentage by weight of cuttings recovered of a size greater than 3.15 mm.

Base formulation: xanthan (2 g/l), KCl (50 g/l).

Different agents given in the table hereunder are added to this formulation.

| Products added to the base formulation | % of cuttings recovered (d > 3.15 mm) |
|---|---|
| nothing | 0 |
| CMC LV (10 g/l) + H3 (4 g/l) | 3 |
| Glycol (40 g/l) | 2 |
| PHPA (2 g/l) | 17 |
| H1PAM (2 g/l) + H3 (4 g/l) | 18 |
| HM HEC (4 g/l) + H3 (4 g/l) | 4 |
| H1PAM (2 g/l) | 17 |
| HM HEC (4 g/l) + H1PAM (2 g/l) | 34 |

The CMC LV is a product manufactured by the AQUALON company.

The PHPA is a partially hydrolyzed polyacrylamide manufactured by the SNF Floerger company.

These results show that on a very reactive system, and under the same salinity conditions, the behaviour of the H1PAM is very close to that of the PHPA concerning its capacity to decrease the break up and the dispersion of the cuttings.

Furthermore, this test confirms that the combination of H1PAM and HM HEC has a synergistic effect and produces excellent results on this particularly reactive system.

TEST No.3: CONTAMINATION THROUGH THE SOLIDS

It is of importance for fluids which can be used in a wellbore or during drilling to have a relatively stable theology in the presence of mineral colloids.

These tests assess the behaviour of the fluid according to the invention in the presence of non prehydrated bentonite. They measure the evolution of the viscosity (mPa.s) of the fluid, for different shear gradients ($s^{-1}$) and different bentonite ratios (g/l). These measurings are performed with a conventional FANN type viscosimeter.

The fluid contains: xanthan (2 g/l), H3 (4 g/l), HM HEC (4 g/l), H1PAM (2 g/l), KCl (5%).

| | Bentonite content (g/l) | | | |
|---|---|---|---|---|
| Shear rate ($s^{-1}$) | 0 | 21 | 105 | 160 |
| 17 | 270 | 300 | 380 | 380 |
| 170 | 65 | 70 | 82 | 85 |
| 1021 | 23 | 28 | 31 | 32 |

The following test allows the fluid to be compared with the formulation of a conventional water-base fluid containing xanthan (4 g/l), CMC (10 g/l) and KCl

| | Bentonite content (g/l) | | | |
|---|---|---|---|---|
| Shear rate ($s^{-1}$) | 0 | 21 | 105 | 160 |
| 17 | 270 | 300 | 420 | 440 |
| 170 | 55 | 55 | 60 | 65 |
| 1021 | 23 | 24 | 28 | 32 |

It can be noted, by comparing the two formulations, that the first formulation corresponding to one of the variants of the fluid of the invention displays better behaviour towards contamination by solids. In particular, the viscosity increase with the increase of the percentage of contaminating solids, measured at a low shear rate, is much lower and even reaches a plateau with the first formulation, unlike the second one corresponding to a conventional water-base formulation. This places less demand on fluid surface reprocessing and is expected to reduce mud dilution. The operating cost can thus be reduced when using the novel formulation.

TEST No.4: FILTRATE CONTROL

Filtrate control is an important property for a well fluid; it is therefore essential to check that the invention is not incompatible with sufficient filtrate reduction characteristics.

Test No.1: Comparison with formulations including conventional filtrate reducers (CMC LV and HEC), without any solid The base fluid includes xanthan (4 g/l), H3 (4 g/l), KCl (5%) and a filtrate reducer: CMC LV, HEC or HM HEC.

The viscosity VP is expressed in milliPascal.second (mPa.s) and the yield value YV in the usual unit (lb/100 ft²), which must be multiplied by 0.4788 to obtain values in Pa.

| Filtrate reducer | CMC LV | HEC | HM HEC |
|---|---|---|---|
| Concentration (g/l) | 10 | 2 | 4 |
| API filtrate - 7'30 (cm³) | 97 | 292 | 61 |
| API filtrate - 30' (cm³) | 102 | 318 | 69 |
| VP (mPa · s) | 13 | 11 | 16 |
| YV (lb/100 ft²) | 14.5 | 15.5 | 14 |

This test shows the advantage provided by the presence of HM HEC if a low filtrate is desired.

Test No.2: Influence of the HM HEC concentration

The base fluid includes xanthan (2 g/l), H3 (4 g/l), HM HEC (2 or 4 g/l), H1PAM (2 g/l) and Chaillac barite for a density d=1.2.

| HM HEC concentration (g/l) | 2 | 4 |
|---|---|---|
| API filtrate - 7'30 (cm³) | 3.1 | 2.7 |
| API filtrate - 30' (cm³) | 5.7 | 5 |
| VP (mPa · s) | 12 | 13 |
| YV (lb/100 ft²) | 7 | 11 |

In both tests, the cake thickness is less than 1 mm.

Test No.3: Influence of the presence of H1PAM

The fluid contains xanthan (2 g/l), H3 (4 g/l), HM HEC (2 g/l), HM PAM (0 and 2 g/l), and Chaillac barite to obtain a density d=1.2.

| H1PAM concentration (g/l) | 0 | 2 |
|---|---|---|
| API filtrate - 7'30 (cm³) | 3.6 | 3.1 |
| API filtrate - 30' (cm³) | 7.6 | 5.7 |
| VP (mPa · s) | 18 | 12 |
| YV (lb/100 ft²) | 2 | 7 |

In both tests, the cake thickness is less than 1 mm.

It can be noted that the combination of HM HEC and HM PAM also allows a better control of the fluid loss to be obtained.

We claim:

1. A process for controlling the dispersion and/or the break up of solids in suspension in a water-based fluid, comprising adding to said fluid (1) a dispersion-preventing amount of a polymer called HM PAM, resulting from the polymerization of at least one hydrophilic unit with a hydrophobic unit, said hydrophilic unit including:

acrylamide according to the following formula:

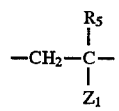

wherein $R_5$ is H or $CH_3$, and $Z_1$ is $CONH_2$, and optionally acrylic acid, acrylate or sulfonate comonomers according to the following formula:

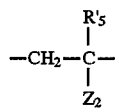

wherein $R'_5$ is H or $CH_3$, and $Z_2$ is COOH or $COO^-$, $M^+$ or $CONHR_1SO^-_{3-}$, $M^+$; $R_1$ is H or $C_1$–$C_{30}$ alkyl, aryl or alkyl-aryl radical, said hydrophobic unit of the polymer HM PAM having the general formula as follows:

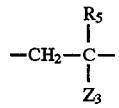

where $R_5$ is H or $CH_3$, and $Z_3$ is $COOR_7$, $COOR_2$, $CONR_1R_2$, or $CONR_1R_7$, $R_7$ being a nonionic surfactant and $R_2$ a $C_1$–$C_{30}$ alkyl, aryl or alkyl-aryl radical; $R_1$ is H or a $C_1$–$C_{30}$ alkyl, aryl or alkyl-aryl radical, and an amount of a hydrophobically modified cellulose derivative, said amount synergistically enhancing the dispersion-preventing activity of HM PAM.

2. A process as claimed in claim 1, wherein the polymer HM PAM has a molecular mass ranging between $10^6$ and $10^7$ daltons and a concentration of hydrophobic units ranging between 0.5 and 5%.

3. A process as claimed in claim 2, wherein the polymer HM PAM, then called H1PAM, has $R_5=CH_3$; $Z_3=COOR_2$ with $R_2=C_9H_{19}$, a molecular mass of about 8 $10^6$ daltons and a concentration of hydrophobic units ranging between 0.5 and 1.5%.

4. A process as claimed in claim 1, wherein said cellulose derivative is hydrophobically modified hydroxyethylcellulose (HM HEC).

5. A process as claimed in claim 4, wherein the modified hydroxyethylcellulose includes a hydrophobic alkyl radical including between 4 and 25 carbon atoms.

6. A process as claimed in claim 4, wherein the molecular mass of the modified hydroxyethylcellulose is less than 2,000,000 daltons.

7. A process as claimed in claim 5, comprising between 1 and 30 g/l of HM PAM and between 1 and 30 g/l of HM HEC.

8. A process as claimed in claim 7, comprising between 1 and 6 g/l of HM PAM and between 1 and 5 g/l of HM HEC.

9. A water-base fluid intended for well drilling, well completion or workover operations in a well, characterized in that it includes in useful amount at least:

a) a polymer called HM PAM, resulting from the polymerization of hydrophilic units with a hydrophobic unit, in that said hydrophilic unit includes:
acrylamide according to the following formula:

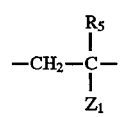

where $R_5$ is H or $CH_3$, and $Z_1$ is $CONH_2$, and optionally acrylic acid, acrylate or sulfonate comonomers according to following formula:

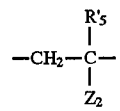

where $R'_5$ is H or $CH_3$, and $Z_2$ is COOH or $COO^-,M^+$ or $CONHR_1SO_3$—, $M^+$; $R_1$ is H or a $C_1$–$C_{30}$ alkyl, aryl or alkyl-aryl radical, in that the hydrophobic unit of the polymer HM PAM has at least one of the following forms: N-alkylacrylamide, alkylacrylate, N-substituted acrylamide or a substituted acrylate, the substituted part being a nonionic surfactant, said hydrophobic part having the general formula as follows:

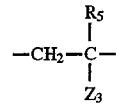

where $R_5$ is H or $CH_3$, and $Z_3$ is $COOR_7$, $COOR_2$, $CONR_1R_2$, or $CONR_1R_7$, $R_7$ being a nonionic surfactant and $R_2$ a $C_1$–$C_{30}$ alkyl, aryl or alkyl-aryl radical; $R_1$ is H or a $C_1$–$C_{30}$ alkyl, aryl or alkyl-aryl radical b) and a hydrophobically modified cellulose derivative.

10. A fluid as claimed in claim 9, characterized in that the polymer HM PAM has a molecular mass ranging between $10^6$ and $10^7$ daltons and a concentration of hydrophobic units ranging between 0.5 and 5%.

11. A fluid as claimed in claim 10, characterized in that the polymer HM PAM, then called H1PAM, has $R_5=CH_3$; $Z_3=COOR_2$ with $R_2=C_9H_{19}$, a molecular mass of about 8 $10^6$ daltons and a concentration of hydrophobic units ranging between 0.5 and 1.5%.

12. A fluid as claimed in claim 9, characterized in that said cellulose derivative is hydrophobically modified hydroxyethylcellulose (HM HEC).

13. A fluid as claimed in claim 12, characterized in that its viscosity is mainly controlled by adding at least one polymer selected from the group made up of xanthan, scleroglucan, wellan, hydroxyethylcellulose (HEC), CMC, guar gum and the polyacrylamides.

14. A fluid as claimed in claim 9, comprising at least one electrolyte at concentrations which can reach saturation.

15. A fluid as claimed in claim 14, characterized in that said electrolyte is selected from the group made up of sodium, potassium, calcium, magnesium or zinc chloride, bromide, carbonate, acetate, formate, sulphate, silicate, phosphate.

16. A fluid as claimed in claim 13, comprising between 0.5 and 30 g/l of HM HEC and of HM PAM, and between 0.5 and 20 g/l of viscosifying polymer.

17. A fluid as claimed in claim 9, which is to a drilling fluid.

18. A process of employing the drilling fluid of claim 17, in a drilling operation wherein the drilling is slimhole and/or strongly deviated drilling.

19. Additive for controlling the dispersion and/or the break up of solids in suspension in a water-base fluid, characterized in that it comprises in useful amount at least:

a) one polymer called HM PAM, resulting from the polymerization of hydrophilic units with a hydrophobic unit, in that said hydrophilic unit includes:

arylamide according to the following formula:

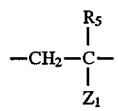

where $R_5$ is H or $CH_3$, and $Z_1$ is $CONH_2$, and optionally acrylic acid, acrylate or sulfonate comonomers according to the following formula:

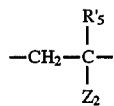

where $R'_5$ is H or $CH_3$, and $Z_2$ is COOH or $COO^-, M^+$ or $CONHR_1SO_3—$, $M^+$; $R_1$ is H or a $C_1$–$C_{30}$ alkyl, aryl or alkyl-aryl radical, in that the hydrophobic unit of the polymer HM PAM has at least one of the following forms: N-alkylacrylamide, alkylacrylate, N-substituted acrylamide or a substituted acrylate, the substituted part being a nonionic surfactant, said hydrophobic part having the general formula as follows:

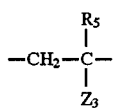

where $R_5$ is H or $CH_3$, and $Z_3$ is $COOR_7$, $COOR_2$, $CONR1R_2$, or $CONR_1R_7$, $R_7$ being a nonionic surfactant and $R_2$ a $C_1$–$C_{30}$ alkyl, aryl or alkyl-aryl radical; $R_5$ is H or a $C_1$–$C_{30}$ alkyl, aryl or alkyl-aryl radical b) and a hydrophobically modified cellulose derivative.

20. A process as claimed in claim 3, wherein said cellulose derivative is hydrophobically modified hydroxyethylcellulose (HM HEC).

21. A process as claimed in claim 20, wherein the modified hydroxyethylcellulose includes a hydrophobic alkyl radical including between 4 and 25 carbon atoms.

22. A fluid as claimed in claim 11, characterized in that said cellulose derivative is hydrophobically modified hydroxyethylcellulose (HM HEC).

23. A process for controlling the dispersion and/or the break up of solids in suspension in a water-based fluid, comprising adding to said fluid a dispersion-preventing amount of a polymer called H1 PAM, resulting from the polymerization of at least one hydrophilic unit with a hydrophobic unit, said hydrophilic unit including:

acrylamide according to the following formula:

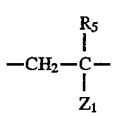

wherein $R_5$ is H or $CH_3$, and $Z_1$ is $CONH_2$, and optionally acrylic acid, acrylate or sulfonate comonomers according to the following formula:

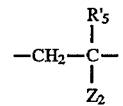

wherein $R'_5$ is H or $CH_3$, and $Z_2$ is COOH or $COO^-$, $M^+$, or $CONHR_1SO^-_3—$, $M^+$; $R_1$ is H or $C_1$–$C_{30}$ alkyl, aryl or alkyl-aryl radical, said hydrophobic unit of the polymer H1 PAM having the general formula as follows:

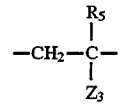

wherein $R_5$ is $CH_3$, $Z_3$ is $COOR_2$, and $R_2$ is $C_9H_{19}$, H1 PAM having a molecular mass of about $8.10^6$ daltons and a concentration of hydrophobic units ranging between 0.5 and 1.5%.

24. In a well drilling process comprising drilling a hole in a geological formation, said drilling resulting in the formation of cuttings, and employing a water-based drilling fluid of sufficient viscosity to remove the cuttings from the hole, the improvement wherein said fluid of sufficient viscosity further comprises a sufficient amount of an additive to control the dispersion and/or the breakup of solids, said additive comprising a polymer called H1 PAM, resulting from the polymerization of at least one hydrophilic unit with a hydrophobic unit, said hydrophilic unit including:

acrylamide according to the following formula:

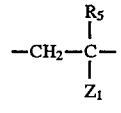

wherein $R_5$ is H or $CH_3$, and $Z_1$ is $CONH_2$, and optionally acrylic acid, acrylate or sulfonate comonomers according to the following formula:

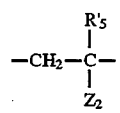

wherein $R'_5$ is H or $CH_3$, and $Z_2$ is COOH or $COO^-$, $M^+$ or $CONHR_1SO^-_3—$, $M^+$; $R_1$ is H or $C_1$–$C_{30}$ alkyl, aryl or alkyl-aryl radical, said hydrophobic unit of the polymer HM PAM having the general formula as follows:

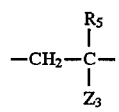

wherein $R_5$ is $CH_3$, $Z_3$ is $COOR_2$, and $R_2$ is $C_9H_{19}$, H1 PAM having a molecular mass of about $8.10^6$ daltons and a concentration of hydrophobic units ranging between 0.5 and 1.5%.

25. In a well drilling process comprising drilling a hole in a geological formation, said drilling resulting in the formation of cuttings, and employing a water-based drilling fluid of sufficient viscosity to remove the cuttings from the hole, the improvement comprising adding to said fluid of sufficient viscosity a sufficient amount of an additive to control the dispersion and/or the breakup of solids, said additive comprising a polymer called HM PAM, resulting from the polymerization of at least one hydrophilic unit with a hydrophobic unit, said hydrophilic unit including:

acrylamide according to the following formula:

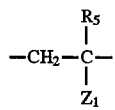

wherein $R_5$ is H or $CH_3$, and $Z_1$ is $CONH_2$, and optionally acrylic acid, acrylate or sulfonate comonomers according to the following formula:

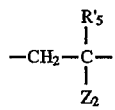

wherein $R'_5$ is H or $CH_3$, and $Z_2$ is COOH or COO—, M+ or $CONHR_1SO_3$—, M+; $R_1$ is H or $C_1$–$C_{30}$ alkyl, aryl or alkyl-aryl radical, said hydrophobic unit of the polymer HM PAM having the general formula as follows:

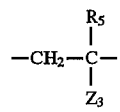

wherein $R_5$ is H or $CH_3$, and $Z_3$ is $COOR_7$, $COOR_2$, or $CONR_1R_7$, $R_7$ being a nonionic surfactant and $R_2$ a $C_1$–$C_{30}$ alkyl, aryl or alkyl-aryl radical; $R_1$ is H or a $C_1$–$C_{30}$ alkyl, aryl or alkyl-aryl radical.

26. A process according to claim 23, said additive further including an amount of a hydrophobically modified cellulose derivative, said amount synergistically enhancing the dispersion-preventing activity of HM PAM.

27. A process according to claim 24, said additive further including an amount of a hydrophobically modified cellulose derivative, said amount synergistically enhancing the dispersion-preventing activity of HM PAM.

28. A process according to claim 25, said additive further including an amount of a hydrophobically modified cellulose derivative, said amount synergistically enhancing the dispersion-preventing activity of HM PAM.

29. A process according to claim 5, wherein the hydrophobic alkyl radical includes between 8 and 18 carbon atoms.

30. A fluid as claimed claim 22, comprising between 0.5 and 10 g/l of HM HEC and of H1PAM, between 1 and 5 g/l of viscosifying polymer, preferably xanthan, between 5 and 100 g/l of KCl or NaCl and between 0 and 30 g/l of reactive clay.

* * * * *